United States Patent
Krachtus

(10) Patent No.: US 7,487,598 B2
(45) Date of Patent: Feb. 10, 2009

(54) METHOD, SYSTEM AND SCALE FOR THE DETERMINATION AND/OR SIMULATION OF PROPORTIONS

(75) Inventor: Werner Krachtus, Schirmitz (DE)

(73) Assignee: motiondrive AG, Weiden (DE)

( * ) Notice: Subject to any disclaimer, the term of this patent is extended or adjusted under 35 U.S.C. 154(b) by 0 days.

(21) Appl. No.: 11/674,697

(22) Filed: Feb. 14, 2007

(65) Prior Publication Data

US 2007/0227026 A1 Oct. 4, 2007

(30) Foreign Application Priority Data

Feb. 14, 2006 (DE) .................. 10 2006 006 791

(51) Int. Cl.
G01B 3/04 (2006.01)
(52) U.S. Cl. .......................... 33/613; 33/645
(58) Field of Classification Search .................. 33/613, 33/645, 1 CC, 1 BB
See application file for complete search history.

(56) References Cited

U.S. PATENT DOCUMENTS

| | | | |
|---|---|---|---|
| 1,332,887 A | 3/1920 | Collins | |
| 1,392,455 A | 10/1921 | Sieger | |
| 2,803,062 A * | 8/1957 | Dutcher | 33/340 |
| 4,383,373 A * | 5/1983 | Couturier | 33/286 |
| 5,012,590 A * | 5/1991 | Wagner et al. | 33/759 |
| 5,195,249 A * | 3/1993 | Jackson | 33/528 |
| 5,528,517 A * | 6/1996 | Loken | 33/1 V |
| 5,803,502 A * | 9/1998 | Noll et al. | 33/758 |
| 5,881,471 A * | 3/1999 | Kaluza | 33/563 |
| 5,956,525 A * | 9/1999 | Minsky | 33/15 |
| 6,108,918 A * | 8/2000 | Ye | 33/12 |
| 6,145,206 A * | 11/2000 | Piccirillo | 33/194 |
| 6,349,478 B1 * | 2/2002 | Ramsey et al. | 33/474 |
| 6,513,257 B2 * | 2/2003 | Nejad-Sattari | 33/563 |
| 6,782,633 B1 | 8/2004 | Cedrone et al. | |
| 6,865,817 B2 * | 3/2005 | Militello et al. | 33/194 |
| 6,959,499 B2 * | 11/2005 | Bini | 33/511 |
| 7,293,368 B1 * | 11/2007 | Faulk et al. | 33/758 |
| 2002/0064301 A1 * | 5/2002 | Sonnenberg et al. | 382/111 |
| 2002/0124426 A1 * | 9/2002 | Dewberry | 33/494 |
| 2003/0145476 A1 | 8/2003 | Chen | |

FOREIGN PATENT DOCUMENTS

| | | |
|---|---|---|
| DE | 3835609 | 4/1990 |
| GB | 2384562 | 7/2003 |

* cited by examiner

Primary Examiner—Christopher W Fulton
(74) Attorney, Agent, or Firm—Price, Heneveld, Cooper, DeWitt & Litton, LLP

(57) ABSTRACT

The present invention relates to a scale, a system and a method for determining and/or simulating the proportional dimensions of a selected area of an object or a location, whereupon in a first step a scale with at least two target points having a defined or definable distance from one another is arranged on a selected area of an object or in a location, whereupon in a second step a reproduction is taken of the object or location by a camera, with a scale affixed in the selected area and whereupon in a third step, the reproduction thus taken is read into data processing equipment which is set up in such a way that the proportional dimensions in a selected area are determined or simulated.

15 Claims, 1 Drawing Sheet

METHOD, SYSTEM AND SCALE FOR THE DETERMINATION AND/OR SIMULATION OF PROPORTIONS

BACKGROUND OF THE INVENTION

1. Field of the Invention

The present invention refers to a method, a system and a scale for the determination and/or simulation of the proportions of dimensions in a selected zone of an object or of a location.

2. Prior Art

Normally, when homes are to be furnished with furniture or decorative items, such as pictures and paintings, or when advertising posters are to be affixed to cars or trucks or the like, the dimensions of the furniture or decorative objects (for example pictures or paintings) as well as advertising prints are determined such that the object on which the billboard is to be affixed, or the room that is to contain a piece of furniture, or the wall that the picture is to hang on are measured with a yard stick, in order to determine afterwards the required size of the furniture, decorative items, pictures or billboard according to the measured data. This requires, however, an elaborate measuring activity at the real objects or locations for which the proportions should be determined. Besides the effort of the elaborate measuring activity which is in this way disadvantageous, often the required measurement data is not at our disposal when a potential item for the object or the location is found, and so a possible purchase decision must be postponed for the complicated acquisition of measurement data.

Furthermore, even when the measurement data exists, it is sometimes difficult to precisely ascertain the dimension of the object due to a lack of imagination as to how the object will appear in the corresponding surroundings.

DISCLOSURE OF THE INVENTION

Object of the Invention

It is therefore the purpose of the present invention to remedy the above-mentioned disadvantages of the prior art in order to provide a simple means for the determination of the proportions of dimensions of an object or a location and in particular to make a simulation for the proportions of dimensions of an object or a place possible. The means that are used for this should be easily producible and operated, and should deliver good results with respect to the determination and/or simulation of proportions.

TECHNICAL SOLUTION

The invention originates from the idea that through placement of a scale in a selected surrounding of an object or a location whose proportions of dimensions are to be determined and/or simulated, a simple determination and/or simulation of proportions thereof is possible by the way, that a reproduction of the object or location will be created together with the scale, and that this image will then become the basis for the determination and/or simulation of proportions of dimensions.

The determination and/or simulation of proportions of the corresponding object or location can be carried out by analysis and/or simulation means on a computer in which the reproduction of the object or location to be sized or simulated can be read in. The analysis and/or simulation means can be realized by a computer program, being stored on computer readable memory means. The memory means can be mobile memory means, which are temporarily connected with the computer system, like CD ROMs, USB (universal serial bus) memory sticks, DVDs and the like, or can be permanently integrated into the data processing equipment, like hard drives, etc. Further, the analysis and/or simulation means realized by program means can also be provided on networks such as, for example, internet by way of long-distance data transmission systems.

The analysis and/or simulation means preferably comprise reading means for reading of the reproduction made from the object or location together with the scale disposed at the object or location. In particular, the reading means can be designed such that they can read digital photographs.

Since at the scale, which is applied to the object or the location whose proportional size is to be determined or simulated, at least two target points having a defined or definable distance between them are provided for according to this invention, the analysis and/or simulation means may comprise means for identifying and localizing the points. In this way, the precise position of the scale can automatically be determined from the reproduction.

This is in particular easily feasible, if corresponding to an advantageous embodiment the target points of the scale have means for exactly determining the point position, specifically by a reticle, a target ring or similar features.

On the basis of the selected or definable distance preset between the two target points, the analysis and/or simulation means can, after detecting of the target points, determine the corresponding real sizes, such as for example the distance of items and the like, for the entire reproduction or for any given part of it. For this reason, the analysis and/or simulation means comprise corresponding calculation means.

According to a preferred embodiment, the scale according to the invention comprises not only two target points, but at least a third target point, and preferably further target points, specifically four. Especially when these target points are not ordered along a straight line, but define a plane or a surface, the perspective of the reproduction can be determined and/or corrected by the further points, since objects, located at a greater distance from the standpoint of the observer, typically appear smaller and a projection of the three-dimensionally disposed objects onto the reproduction plane by a simple transfer of the scale would lead to a falsification of the proportions.

The analysis and/or simulation means preferably also comprise means for producing and/or for reading in image components and/or means for fading in image components into the reproduction of the object or location. In this way items, which are to be arranged at the object or in the location, can be illustrated, i.e., simulated in the environment of the reproduction by reading in a corresponding image representation or by producing an artificial image component. Accordingly, the illustration or simulation can be effected in the right measuring unit, i.e., the correct proportions.

Especially, when the analysis and/or simulation means also comprise means for displaying the reproduction and/or additional image components on a monitor, a simulation of the arrangement of the items at an object or in a location can be achieved. The means for displaying the reproduction and/or additional image components can, in addition to monitors, comprise printing devices or a storage memory and the like. Best of all, however, is the visual reproduction on a monitor or the like, by which the user becomes able to see an immediate view of the planned item within the subsequent environment. This is particularly advantageous when the corresponding inventive system and method is deployed together with online applications on the internet or the like. For example, the user can look for a piece of furniture online on his furniture supplier's website, can upload a reproduction of the planned location in which he wishes to arrange that furniture together with the scale according to the invention on the server of the online furniture shop and the analysis and/or simulation means of the server of the online furniture store can display the selected furniture in the planned environment of the user on the user's computer screen.

Consequently, it is only necessary for the user to acquire the corresponding scale, while the analysis and/or simulations means are provided by the online furniture shop. It is, however, also imaginable that besides the scale, the user has installed the analysis and/or simulations means on his local data processing equipment. Since the corresponding inventive method and system are based upon the idea that an image of the corresponding object or location is made, preferably means for producing a corresponding reproduction of the object or the location are also provided for; these means would preferably comprise a camera, specifically a digital camera and/or a reading device like a scanner or the like.

Because at the time of the production of the image of the object or the location, the scale must be arranged at the object or in the location, in particular means for removably arranging the scale at the object or the location are provided for. For example, glue means or other adhesives, like hook-and-loop fasteners or the like that would be easily removable.

In sum, the inventive system or method provides an easy and effective possibility to determine or simulate the proportions of an object or at a location.

BRIEF DESCRIPTION OF THE FIGURES

Further advantages, characteristics and features of the present invention will be made explicit by the following description of preferred embodiments.

PREFERRED EMBODIMENTS

Figure 1:
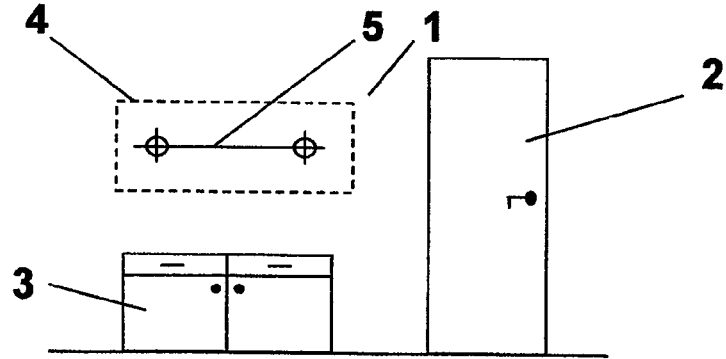
FIG. 1 is a side view of a location in which the proportional dimensions are to be determined.

FIG. 1 shows a side view of a wall 1 of a room, whose proportions are to be determined. This is to be done because a picture 4 (dotted line) is to be hung on wall 1. Here, the problem is to determine the space a picture will occupy on a planned spot on wall 1. Especially, the positions of surrounding objects such as door 2 or commode 3 play critical roles. In order to get an idea of how the picture 4 will appear on the determined space in the corresponding environment on wall 1, it is preferable to get a virtual view of such a picture, in order to get an impression of whether a determined size of picture fits harmoniously into the given environment.

To this end, according to the invention, a scale 5 is arranged in the area in question where later the picture will hang on wall 1.

Figure 2:
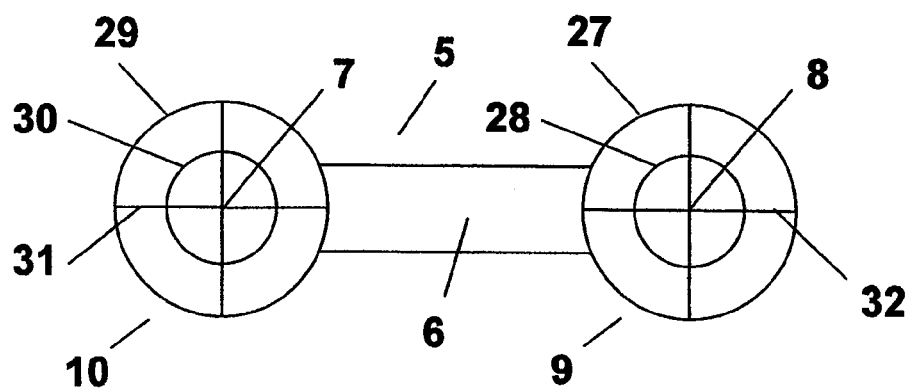
FIG. 2 is a side view of one embodiment of the inventive scale.

The scale 5 shown in FIG. 2 is comprised of two target points 7 and 8 which are disposed at a distance from one another. At the embodiment of a scale shown in FIG. 2 the target points 7 and 8 are disposed in concentric discs 10 and 9, which are connected to each other by a fixed distance holder in the form of a strip 6.

On the circular discs, whose center points are the target points 7 and 8, circular rings are painted respectively at the edge and in an intermediate area, and upon these in addition a reticle (crosshairs) is placed through the two target points 7 and 8, respectively. Both these circular rings 27 to 30 and the crosshairs 31 and 32 serve to make it easier to detect target points 7 and 8.

Scale 5 of the embodiment shown in FIG. 2 is made of paper or cardboard and has on its flipside a glue or adhesive coating that makes possible in particular a detachable mounting of scale 5 on a variety of objects, such as for example, walls 1, plastics, metal and other such things.

Figure 4:
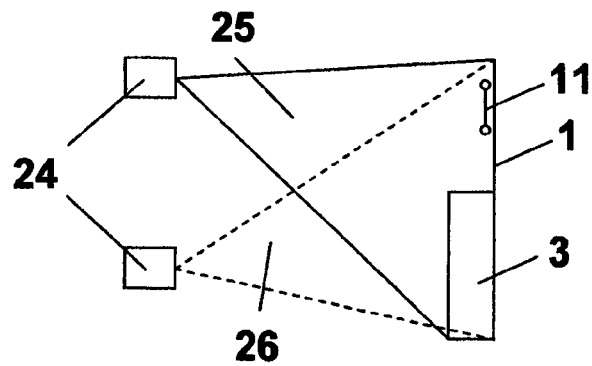
FIG. 4 is a schematic illustration of the perspective correction.

In order to determine and/or simulate the proportions on wall 1, scale 5 as shown in FIG. 2 is to be put on wall 1 in the area in which picture 4 is to be placed. After affixing scale 5 to the wall by means of the glue or adhesive coating, a picture is to be taken of wall 1 with a camera 24 as shown in FIG. 4.

Since spacer 6 shows a fixed pre-set length and scale 5 is attached in a smooth and stretched manner on wall 1, the proportions on the wall 1 can be determined on the basis of the scale being present in the picture taken of the wall 1 together with scale 5 by the camera 24. In particular, for instance, it is possible to calculate the size of the commode 3 or the door 2.

Accordingly, it is possible to display pictures 4 having a pre-set dimension in a true-to-scale representation in the reproduction. For this purpose, the reproduction, which by means of camera 24 is taken of the area in question of wall 1, is read into a data processing equipment, for example through direct reading from image data of a digital image in a storage memory of the data processing equipment or through scanning the image and further processing the captured digital image.

In the data processing equipment, the analysis and/or simulation means are provided for which enable one to determine the proportional dimensions in the reproduction based on the pictured image of scale 5.

Since preferably the corresponding means for representing the reproduction and/or the additional image components is present on the computer, it is also possible to project image components with specific sizes at correct scale in the reproduction. By this way the picture to be hung can be virtually displayed on the wall. Moreover, because the corresponding means for producing or reading image components is integrated into the computer, in particular individual original image components can be integrated into the reproduction.

In sum, it is thus ascertained that in this way simulations of virtual, i.e. artificially generated or real objects can easily be represented at correct scale in real environments. This cannot only be helpful in the choice of a picture for a room or for a wall, but also generally for all possible objects like, for example, furniture in rooms, constructions such as houses on squares, streets and so on. Besides this, the invention can for example be deployed for billboards and advertising posters.

Figure 3:
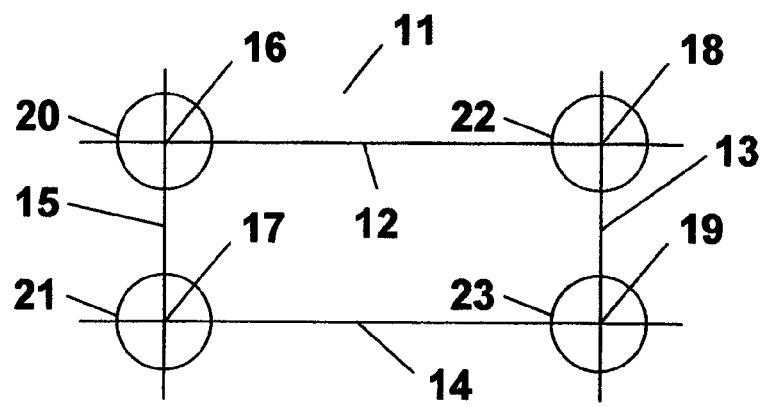
FIG. 3 is a side view of a second embodiment of the inventive scale.

A second embodiment of an inventive scale 11 is illustrated in FIG. 3. Instead of the two target points 7 and 8, as in the embodiment in FIG. 2, on the embodiment of scale 11 there are four target points, 16,17,18, 19 which are paired off with the respective spacers 15,14,13 and 12 at a distance from one another.

Around the target points 16 to 19, again means for detecting the targets in form of target rings 20, 21, 22 and 23 as well as corresponding reticules are provided for.

Through the supplementary target points it is possible to take into account the angle (vantage point) and/or the perspective of the camera during the generation of the image, so that the exact determination of the proportions and in particular a simulation of the proportional dimensions becomes possible.

As FIG. 4 shows in a side view, the altitude of camera 24 can lead to different viewing directions and angles of view for the reproduction, evoked here through both triangles 25 and 26 (dotted lines). Since, for example, for a rectangular scale form at which target points 16 to 19 are sitting on the corner of a rectangle, the distortion into a trapezoid or something similar indicates oblique image conditions, the angle distortion can be calculated and taken into consideration by means of data provided by the scale.

Like scale 5 in FIG. 2, scale 11 in FIG. 3 can be made either out of paper or out of cardboard. According to the spatial greater extension due to the large number of target points, it is however similarly advantageous, as with scale 5, to make it out of synthetic material, for example plastics. In the same way, scale 11 is coated on the back with glue or adhesive coating which serves to temporarily affix scale 11 to an object.

While the preferred embodiments of scale 5 and scale 11, shown in FIGS. 2 and 3, comprise fixed distance holders or spacers 6 or 12 through 15, it is also conceivable to create them with variable adjustable spacers, which for example telescope into and over one another. Moreover, it is also possible to apply the target points without a spacer and to measure precisely the distance between the target points, with the corresponding distance being fed into the analysis and/or simulation means in the data processing equipment.

Although the present invention has been explained on the basis of the preferred embodiments, it goes without saying that the protection of this invention is not limited to these embodiments, but that through the scope of protection of the enclosed claims, protection is defined. Moreover, all combinations of the features of the invention that are in the specification and the claims are conceivable.

The invention claimed is:

1. Scale device for determining and/or simulating proportions in a selected area of an object or a location,
   wherein at least two target points are provided for; the target points having a defined or definable distance between the target points and being designed such that they can be disposed at the object or in the location;
   wherein the target points comprise means for exactly determining a point position, the target points comprising one of reticles and target rings; and
   wherein fixation means for detachably fixing of the target points to the object or in the location are provided for.

2. The scale device according to claim 1, wherein at least a third target point is provided for.

3. The scale device according to claim 1, wherein one of the target points is connected to at least a further target point by a fixedly pre-set or a variable adjustable spacer.

4. The scale device according to claim 1, wherein the fixation means comprise at least one of the group containing sticking means, removable sticking means, detachable adhesive means and hook—and pile—fasteners.

5. The scale device according to claim 1, wherein the scale device is made in one piece out of at least one of the materials of the group containing paper, cardboard, synthetic materials and plastics.

6. System for determining and simulating proportions in a selected area of an object or a location, wherein a scale device and analysis and simulation means are provided for, the scale device comprising at least two target points having a defined or definable distance between the target points and being designed such that they can be disposed at the object or in the location and the analysis and simulation means comprising an analysis and simulation method stored on storage means to be read by a data processing equipment for carrying out the analysis and simulation method, wherein the analysis and simulation means comprise reading means for reading into a computer a reproduction of the object or the location with the scale device attached at the object or in the location, wherein the analysis and simulation means comprise means for identifying and localizing the target points to automatically calculate proportions of reproduction or parts thereof from the scale device, and wherein the analysis and simulation means comprise means for producing and/or reading in image components and means for superimposing or fading image components into a reproduction of the object or location.

7. The system according to claim 6, wherein the analysis and simulation means comprise means for determining or correcting a perspective of the reproduction.

8. The system according to claim 6, wherein the analysis and simulation means comprise means for displaying the reproduction and/or additional image components.

9. The system according to claim 6, wherein the system comprises means for generating the reproduction of the object or the location with the scale device mounted on it.

10. The system according to claim 6, wherein the system comprises at least one of a camera, a digital camera and a scanner.

11. The system according to claim 6, wherein the analysis and simulation means comprise data transmission means for transmission of at least one of pictures, texts and control data.

12. The system according to claim 11, wherein the data transmission means are designed such that online transmission can take place during analysis.

13. The system according to claim 6, wherein the analysis and simulation means comprise at least one of wireless transmission means, data and telephone networks and internet connections.

14. A method for determining and simulating the proportions in a selected area of an object or a location, wherein the following steps are carried out:
   in a first step, a scale device is arranged in a selected place on the object or the location;
   in a second step, a reproduction is generated of the object or location together with the scale device in the selected place; and
   in a third step, the reproduction is read into data processing equipment, which is equipped such that proportions in the reproduction can be determined or simulated in the selected area:
   wherein the data processing equipment comprises analysis and simulation means, wherein the analysis and simulation means comprise means for automatically calculating proportions of reproduction or parts thereof from the scale device, and wherein the analysis and simulation means comprise means for producing and/or reading in image components and means for superimposing or fading image components into the reproduction of the object or location.

15. The method according to claim 14,
wherein the method is used for virtual representation of at least one of an image product, a poster, a painting, a photo, a printing product and an advertising graphic.

* * * * *